(12) United States Patent
Okita

(10) Patent No.: US 9,657,575 B2
(45) Date of Patent: May 23, 2017

(54) GAS TURBINE ENGINE

(71) Applicant: Yoji Okita, Tokyo (JP)

(72) Inventor: Yoji Okita, Tokyo (JP)

(73) Assignee: IHI CORPORATION (JP)

( * ) Notice: Subject to any disclaimer, the term of this patent is extended or adjusted under 35 U.S.C. 154(b) by 702 days.

(21) Appl. No.: 14/077,460

(22) Filed: Nov. 12, 2013

(65) Prior Publication Data
US 2014/0286773 A1 Sep. 25, 2014

Related U.S. Application Data

(63) Continuation of application No. PCT/JP2012/061935, filed on May 10, 2012.

(30) Foreign Application Priority Data

May 13, 2011 (JP) .................. 2011-108720

(51) Int. Cl.
| | | |
|---|---|---|
| *F01D 5/08* | (2006.01) | |
| *F01D 5/18* | (2006.01) | |
| *F01D 9/04* | (2006.01) | |
| *F01D 5/14* | (2006.01) | |

(52) U.S. Cl.
CPC ............... *F01D 5/08* (2013.01); *F01D 5/143* (2013.01); *F01D 5/145* (2013.01); *F01D 5/186* (2013.01);
(Continued)

(58) Field of Classification Search
CPC .......... F01D 5/143; F01D 5/145; F01D 9/041; F01D 5/08; F05D 2250/611; F05D 2240/121
See application file for complete search history.

(56) References Cited

U.S. PATENT DOCUMENTS

| | | | | |
|---|---|---|---|---|
| 6,478,545 B2 * | 11/2002 | Crall | ................... | B23K 20/129 |
| | | | | 29/889.1 |
| 7,220,100 B2 * | 5/2007 | Lee | ........................ | F01D 5/143 |
| | | | | 415/191 |

(Continued)

FOREIGN PATENT DOCUMENTS

| | | |
|---|---|---|
| EP | 1 087 100 A2 | 3/2001 |
| EP | 1 681 438 A2 | 7/2006 |

(Continued)

OTHER PUBLICATIONS

Japanese Notice of Allowance, dated Oct. 20, 2015, issued in corresponding Japanese Patent Application No. 2011-108720. English Translation. Total 6 pages.

(Continued)

*Primary Examiner* — Gregory Anderson
*Assistant Examiner* — Maxime Adjagbe
(74) *Attorney, Agent, or Firm* — Ostrolenk Faber LLP

(57) ABSTRACT

The gas turbine engine (S1) includes: turbine blades (7b); and a cooling air supply unit (11) to supply cooling air to the turbine blades (7b). A flow path surface (31) is formed so as to be positioned in an upstream side of the turbine blades (7b) and so as to be connected to a base surface (32) in which the turbine blades (7b) are provided. The flow path surface (31) includes: depression portions (31a) depressed relative to the base surface (32), each depression portion (31a) including at least an area overlapping with a front end (7b1) of each turbine blade (7b), when viewed from a direction of the turbine axis (L); and protrusion portions (31b) protruding relative to the base surface (32), each protrusion portion (31b) being at least part of each area positioned between front ends (7b1) of the turbine blades (7b), when viewed from the above direction.

6 Claims, 3 Drawing Sheets

(52) U.S. Cl.
CPC ........ *F01D 9/041* (2013.01); *F05D 2240/121* (2013.01); *F05D 2240/81* (2013.01); *F05D 2250/611* (2013.01); *F05D 2260/202* (2013.01); *Y02T 50/673* (2013.01); *Y02T 50/676* (2013.01)

(56) References Cited

U.S. PATENT DOCUMENTS

| | | | |
|---|---|---|---|
| 7,249,933 B2 * | 7/2007 | Lee | ......... F01D 5/143 416/193 A |
| 7,766,618 B1 | 8/2010 | Liang | |
| 2010/0111682 A1 * | 5/2010 | Scoggins | ......... F01D 9/041 415/191 |
| 2011/0044818 A1 | 2/2011 | Kuhne et al. | |

FOREIGN PATENT DOCUMENTS

| | | |
|---|---|---|
| JP | 55-069703 | 5/1980 |
| JP | 2002-276301 | 9/2002 |
| JP | A-2003-106106 | 4/2003 |
| JP | 2004-084539 | 3/2004 |
| JP | 2004-239139 | 8/2004 |
| JP | 2005-194914 | 7/2005 |
| JP | 2008-248701 | 10/2008 |
| JP | 2009-174330 | 8/2009 |
| JP | 2009-191656 | 8/2009 |
| JP | A-2010-216422 | 9/2010 |
| WO | WO 2006/033407 A1 | 3/2006 |

OTHER PUBLICATIONS

Extended European Search Report and European Opinion dated Feb. 4, 2015 in corresponding European Patent Application No. 12785456.0 (5 pages).

International Search Report and Written Opinion mailed Jun. 5, 2012 in corresponding PCT International Application No. PCT/JP2012/061935.

* cited by examiner

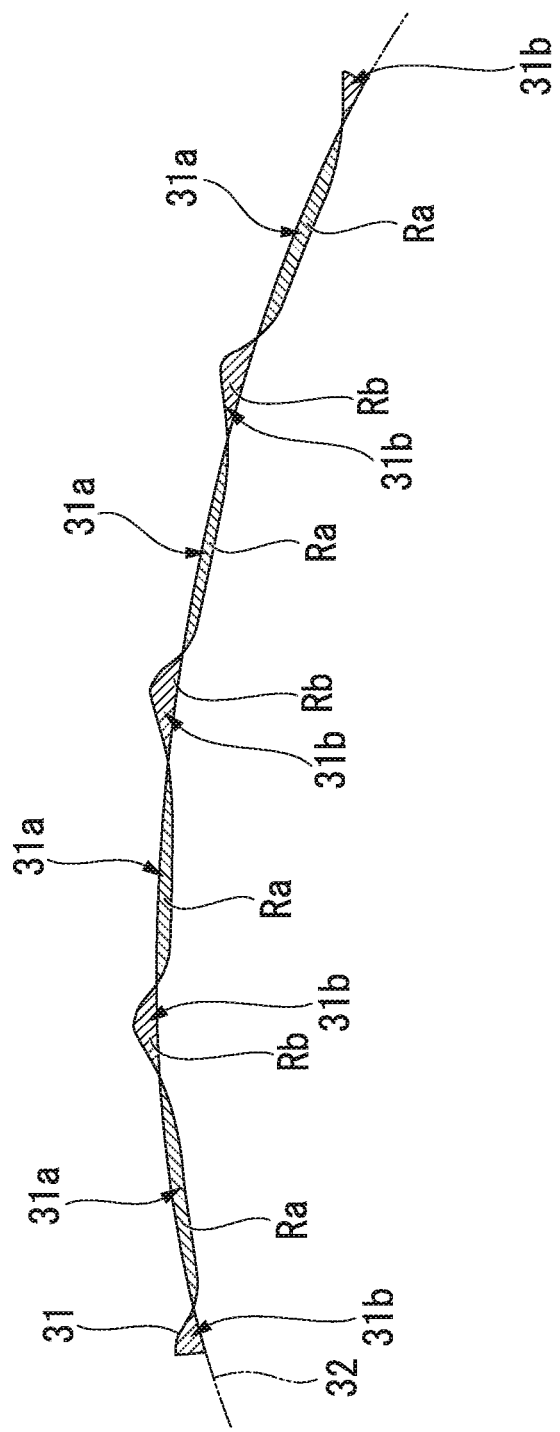

GAS TURBINE ENGINE

The present application is a Continuation of PCT International Application No. PCT/JP2012/061935, filed May 10, 2012, which claims priority to Japanese Patent Application No. 2011-108720, filed May 13, 2011, the contents of which are incorporated herein by reference. The PCT International Application was published in the Japanese language.

TECHNICAL FIELD

The present invention relates to a gas turbine engine.

BACKGROUND ART

A gas turbine engine such as a jet engine includes a turbine blade cascade composed of turbine blades (turbine rotor blades or turbine stator blades) annularly arranged around a turbine axis.

As shown in Patent Documents 1 or 2, each turbine blade is fixed to an end wall annularly formed around the turbine axis.

DOCUMENT OF RELATED ART

Patent Document

[Patent Document 1] Japanese Unexamined Patent Application, First Publication No. 2009-191656

[Patent Document 2] Japanese Unexamined Patent Application, First Publication No. 2009-174330

SUMMARY OF INVENTION

Technical Problem

Since the turbine blades and the end wall are exposed to combustion gas having a high temperature, high heat-resistance performance is required therefor. In order to satisfy the required heat-resistance performance, a method to cool the turbine blades and the end wall is proposed.

Specifically, as one such method, a method is proposed in which cooling air is supplied to the upstream side of the turbine blades, the cooling air flows along the surface of the end wall, and thereby the film cooling is performed on the surface of the end wall.

However, the static pressure distribution at the surface of the end wall in the upstream side of the turbine blades becomes non-uniform due to the existence of the turbine blades. That is, in the upstream side of the turbine blades, the static pressure distribution in the circumferential direction around the turbine axis may become non-uniform.

If the static pressure distribution becomes non-uniform, an area in which the cooling air easily flows and another area in which the cooling air does not easily flow are generated in the upstream side of the turbine blades, and the thickness of a cooling film (a layer of cooling air) becomes non-uniform.

As a result, the temperature at the surface of the end wall may become non-uniform in the upstream side of the turbine blades, an area having a high temperature may be generated therein, and thereby the dispersion of the cooling efficiency at a flow path surface may be enlarged.

The flow rate of the supplied cooling air has to be set so that the heat-resistance performance is satisfied in the above-described area in which the cooling air does not easily flow and the cooling film is thin. Therefore, in a case where the dispersion of the cooling efficiency at the flow path surface is large, when the supply flow rate of the cooling air to the area in which the cooling air does not easily flow is set at a flow rate sufficient to satisfy the heat-resistance performance, the supply flow rate of the cooling air to the area in which the cooling air easily flows becomes excessive relative to the flow rate sufficient to satisfy the heat-resistance performance.

As a result, the entire supply of the cooling air may be increased, and the performance of the gas turbine engine may deteriorate.

The present invention has been made in view of the above circumstances, and aims to provide a gas turbine engine in which cooling air is supplied to a flow path surface in the upstream side of a turbine blade cascade and the cooling efficiency at the flow path surface becomes uniform.

Solution to Problem

As means to solve the above problems, the present invention adopts the following configurations.

According to a first aspect of the present invention, a gas turbine engine includes: a turbine blade cascade formed by annularly arranging turbine blades around a turbine axis; and a cooling air supply unit to supply cooling air to the turbine blades. A flow path surface is formed so as to be positioned in an upstream side of the turbine blade cascade and so as to be connected to a base surface in which the turbine blades are provided. The flow path surface includes: depression portions depressed relative to the base surface, each depression portion including at least an area overlapping with a front end of each of the turbine blades, when viewed from a direction of the turbine axis; and protrusion portions protruding relative to the base surface, each protrusion portion being at least part of each area positioned between front ends of the turbine blades, when viewed from the direction of the turbine axis.

According to a second aspect of the present invention, in the first aspect, a depression area formed by the depression portion and the base surface viewed from the direction of the turbine axis, and a protrusion area formed by the protrusion portion and the base surface viewed from the direction of the turbine axis are set equal to each other.

According to a third aspect of the present invention, in the first or second aspect, the turbine blades are turbine stator blades.

Effects of Invention

If a flow path surface (hereinafter, referred to as the upstream flow path surface of a turbine blade cascade) formed so as to be positioned in the upstream side of the turbine blade cascade and so as to be connected to a formation area (a base surface in which turbine blades are provided) of the turbine blade cascade is depressed relative to the formation area of the turbine blade cascade, it is possible to prevent the increase of the static pressure due to the existence of the turbine blades.

In the present invention, depression portions depressed relative to the base surface in which the turbine blades are provided are formed, and each depression portion is formed in an area including at least an area overlapping with the front end of each of the turbine blades, when viewed from the direction of a turbine axis.

If the depression portion is not formed, the static pressure in the area overlapping with the front end of the turbine blade when viewed from the direction of the turbine axis is increased due to the existence of the turbine blade. Therefore, according to the present invention, by the depression portion, it is possible to prevent the increase of the static pressure in the area in which the static pressure is usually increased excessively.

Consequently, according to the present invention, it is possible to uniformize the static pressure distribution in the circumferential direction around the turbine axis, and to uniformize the thickness of a layer of cooling air (hereinafter, referred to as the cooling film) supplied from a cooling air supply unit.

As a result, according to the present invention, it is possible to prevent an area having a high temperature from being generated in the upstream flow path surface of the turbine blade cascade, and to uniformize the cooling efficiency at the flow path surface. Since the supply of the cooling air does not have to be increased to satisfy the supply to the area having low cooling efficiency, it is possible to reduce the entire supply of the cooling air, and to improve the performance of a gas turbine engine.

In addition, if only the above-described depression portions are formed, since the flow path surface is shifted so that its flow path area is enlarged, the flow path area in the upstream side of the turbine blade cascade may be enlarged, and thereby the aerodynamic characteristics in the upstream side of the turbine blade cascade may be changed.

In contrast, in the present invention, protrusion portions protruding relative to the base surface in which the turbine blades are provided are formed, each protrusion portion is formed in at least part of each area positioned between the front ends of the turbine blades when viewed from the direction of the turbine axis.

Therefore, according to the present invention, the flow path surface is shifted so that the flow path area at the protrusion portion is reduced, and thereby the flow path area in the upstream side of the turbine blade cascade is reduced. By balancing the decrement of the flow path area by the protrusion portion with the increment of the flow path area by the depression portion, it is possible to prevent the entire flow path area in the upstream side of the turbine blade cascade from being changed.

Consequently, according to the present invention, it is possible to prevent the aerodynamic characteristics thereof from being changed, and to uniformize the cooling efficiency at the flow path surface.

BRIEF DESCRIPTION OF DRAWINGS

FIG. 3 is a schematic diagram showing depression portions and protrusion portions which are provided in the jet engine in the embodiment of the present invention.

DESCRIPTION OF EMBODIMENTS

An embodiment of a gas turbine engine relating to the present invention is described below with reference to the drawings. In the following drawings, the scale of each member is appropriately changed so that each member has a recognizable size. In addition, in the following description, as an example of a gas turbine engine, a jet engine including two shafts is described.

Figure 1:
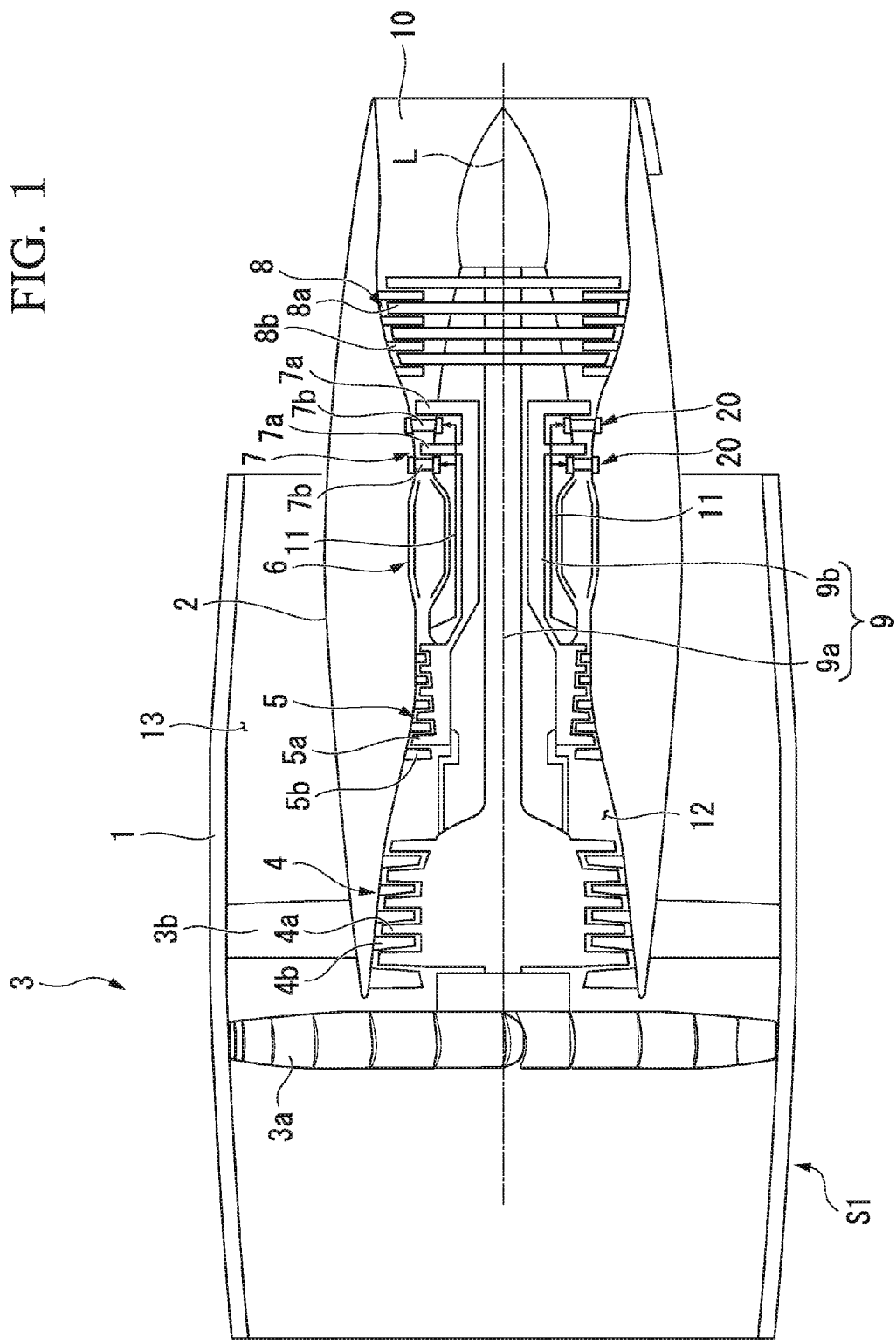
FIG. 1 is a cross-sectional view showing a schematic configuration of a jet engine in an embodiment of the present invention.

FIG. 1 is a cross-sectional view showing a schematic configuration of a jet engine S1 of this embodiment.

As shown in this drawing, the jet engine S1 of this embodiment includes an outer cowl 1, an inner cowl 2, a fan 3, a low pressure compressor 4, a high pressure compressor 5, a combustion chamber 6, a high pressure turbine 7, a low pressure turbine 8, a shaft 9, a main nozzle 10, and a cooling air supply unit 11.

The outer cowl 1 is a cylindrical member disposed in the upstream side in the jet engine S1. In the outer cowl 1, the upstream end and the downstream end thereof in the air-flowing direction therein are formed into open ends, and the upstream end functions as an air inlet. In addition, in the following description, the upstream side may be referred to as the "front side", and the downstream side may be referred to as the "back side".

As shown in FIG. 1, the outer cowl 1 houses the portion of the inner cowl 2 in the upstream side, and the fan 3, in the inside thereof.

The inner cowl 2 is a cylindrical member having a smaller diameter than that of the outer cowl 1. In the inner cowl 2, the upstream end and the downstream end thereof in the air-flowing direction therein are formed into open ends, similarly to the outer cowl 1.

The inner cowl 2 houses the low pressure compressor 4, the high pressure compressor 5, the combustion chamber 6, the high pressure turbine 7, the low pressure turbine 8, the shaft 9, the main nozzle 10 and the like in the inside thereof. The just specified elements housed in the inner cowl 2 are located in the main section of the jet engine S1.

The inside of the inner cowl 2 is configured as a flow path (hereinafter, referred to as a core flow path 12) in which part of the air which has been taken into the outer cowl 1, and the hot gas generated in the combustion chamber 6 flow.

As shown in FIG. 1, the outer cowl 1 and the inner cowl 2 are disposed concentrically with each other when viewed from the air-flowing direction, so that a space is formed between them. The space between the outer cowl 1 and the inner cowl 2 is configured as a bypass flow path 13 in which the other part of the air which has been taken into the outer cowl 1 other than the part of the air flowing into the core flow path 12 flows downstream.

The outer cowl 1 and the inner cowl 2 are attached to the airframe of an aircraft through pylons (not shown).

The fan 3 makes an air flow flowing into the outer cowl 1. The fan 3 includes fan rotor blades 3a fixed to the shaft 9, and fan stator blades 3b disposed in the bypass flow path 13.

In addition, the shaft 9 described below is divided into two members in the radial direction thereof when viewed from the air-flowing direction. In more detail, the shaft 9 is composed of a first shaft 9a as a solid shaft constituting the core of the shaft 9, and a second shaft 9b as a hollow shaft disposed in the outside of the first shaft 9a so as to surround the first shaft 9a. The fan rotor blades 3a are fixed to the first shaft 9a in the shaft 9.

The low pressure compressor 4 is disposed in the downstream side of the fan 3 and in the upstream side of the high pressure compressor 5, and compresses the air which has been sent into the core flow path 12 by the fan 3.

The low pressure compressor 4 includes rotor blades 4a fixed to the first shaft 9a in the shaft 9, and stator blades 4b fixed to the inner wall of the inner cowl 2. Rotor blades 4a are arranged in the circumferential direction of the shaft 9 at regular intervals, and thereby compose one rotor blade cascade. In addition, stator blades 4b are arranged in the circumferential direction of the shaft 9 at regular intervals, and thereby compose one stator blade cascade. Rotor blade cascades and stator blade cascades are alternately disposed in the air-flowing direction.

As shown in FIG. 1, the high pressure compressor 5 is disposed in the downstream side of the low pressure compressor 4, and compresses the air which has been sent thereinto from the low pressure compressor 4, so that the air has a higher pressure.

The high pressure compressor 5 includes rotor blades 5a fixed to the second shaft 9b in the shaft 9, and stator blades 5b fixed to the inner wall of the inner cowl 2. In addition, the rotor blades 5a and the stator blades 5b are disposed similarly to the rotor blades 4a and the stator blades 4b of the low pressure compressor 4.

The combustion chamber 6 is disposed in the downstream side of the high pressure compressor 5. The combustion chamber 6 combusts air-fuel mixture of compressed air sent thereinto from the high pressure compressor 5 and fuel supplied from injectors (not shown), and thereby generates hot gas (combustion gas).

The high pressure turbine 7 is disposed in the downstream side of the combustion chamber 6, and generates rotative force by using the hot gas discharged from the combustion chamber 6.

The high pressure turbine 7 includes turbine rotor blades 7a fixed to the second shaft 9b in the shaft 9, and turbine stator blades 7b fixed to the core flow path 12 (the inner wall of the inner cowl 2). The turbine rotor blades 7a receives the hot gas which has been adjusted by the turbine stator blades 7b, thereby rotationally driving the second shaft 9b.

In this embodiment, the turbine stator blades 7b included in the high pressure compressor 7 correspond to the turbine blades of the present invention. Turbine stator blades 7b are annularly arranged around a turbine axis L (see FIG. 1), and compose one turbine stator blade cascade 20 (turbine blade cascade). That is, in this embodiment, turbine stator blade cascades 20 are formed by annularly arranging the turbine stator blades 7b around the turbine axis L.

Figure 2:
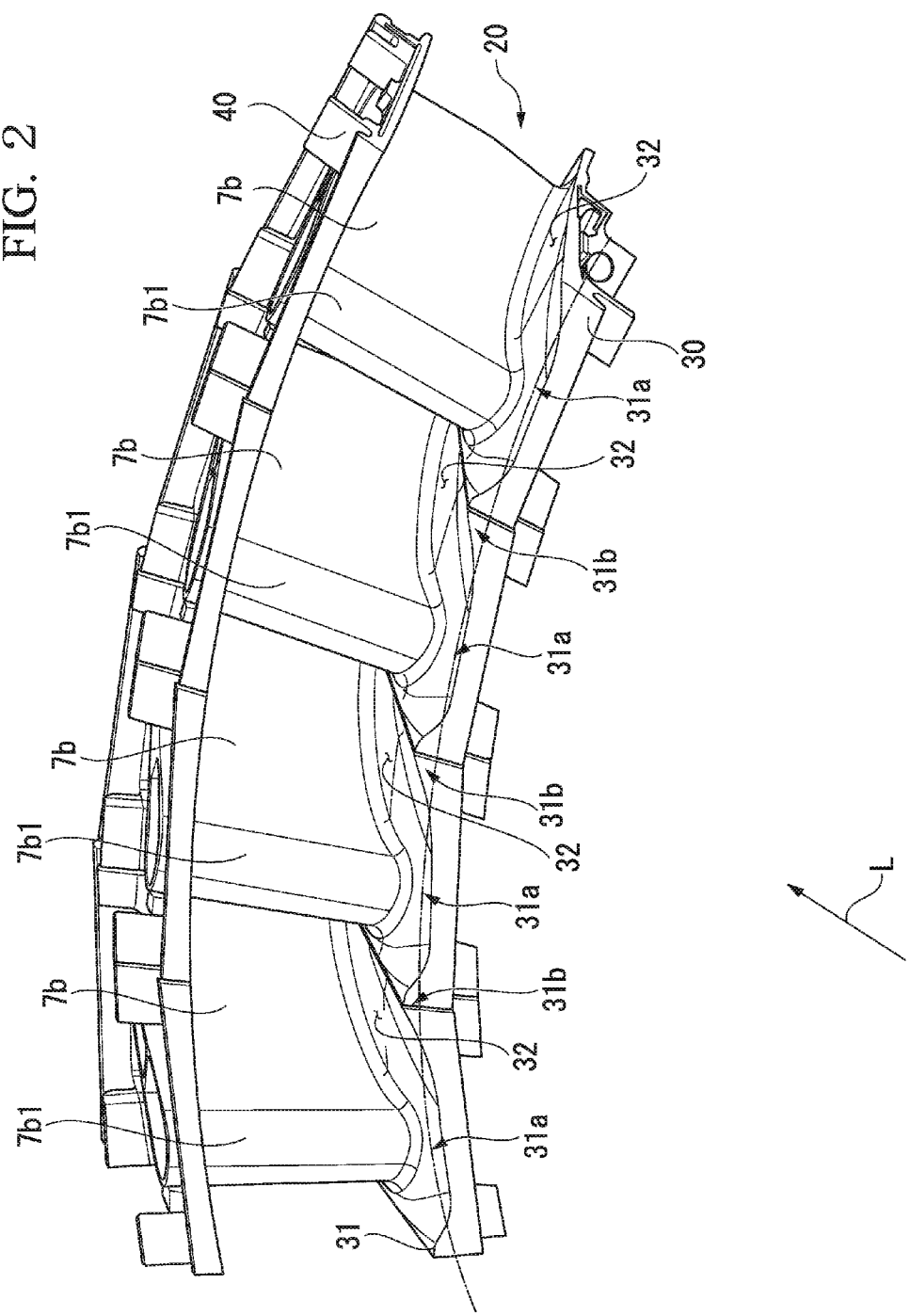
FIG. 2 is an enlarged perspective view of part of a turbine stator blade cascade provided in the jet engine in the embodiment of the present invention.

FIG. 2 is a perspective view of part of the turbine stator blade cascade 20. An inner end wall 30 and an outer end wall 40 are provided inside the inner cowl 2 (see FIG. 1), and each of them is annularly formed around the turbine axis L. The diameter of the inner end wall 30 is smaller than that of the outer end wall 40. The inner end wall 30 is disposed inside the outer end wall 40 in the radial direction thereof.

As shown in FIG. 2, the end of each turbine stator blade 7b in the hub side thereof (the near side to the turbine axis L, inward in the radial direction of the shaft 9 (see FIG. 1)) is fixed to the inner end wall 30, and the end of each turbine stator blade 7b in the tip side thereof (the far side from the turbine axis L, outward in the radial direction of the shaft 9) is fixed to the outer end wall 40. That is, the turbine stator blades 7b are disposed so as to connect the inner end wall 30 and the outer end wall 40.

Each of the inner end wall 30 and the outer end wall 40 is formed so as to protrude backward and forward relative to the turbine stator blades 7b in the direction of the turbine axis L. Therefore, in each of the upstream side and the downstream side of the turbine stator blades 7b, the flow path for the hot gas discharged from the combustion chamber 6 is formed by the inner end wall 30 and the outer end wall 40.

In this embodiment, an upstream flow path surface 31 (flow path surface) as part of the surface of the inner end wall 30 is positioned in the upstream side of the turbine stator blade cascade 20 in the direction of the turbine axis L, and as shown in the schematic diagram of FIG. 3, the upstream flow path surface 31 includes depression portions 31a and protrusion portions 31b.

In addition, the upstream flow path surface 31 is formed so as to be smoothly connected to a base surface 32 of the inner end wall 30, the base surface 32 in which the turbine stator blades 7b are provided.

Each depression portion 31a is provided in an area including at least an area overlapping with the front end 7b1 (the end in the upstream side) of the turbine stator blade 7b when viewed from the direction of the turbine axis L and is formed so as to be depressed relative to the base surface 32 in which the turbine stator blades 7b are provided.

In the depression portion 31a, a surface of the inner end wall 30 is shifted toward the turbine axis L (inward in the radial direction of the shaft 9), relative to the base surface 32, and thereby a depression is formed.

The base surface 32 is a surface by which mainly the turbine stator blades 7b are supported. As shown in FIG. 2, the base surface 32 denotes a surface of the inner end wall 30, in which at least the half (from the middle position between the front end and the back end thereof, to the back end) of the turbine stator blade 7b (turbine blade) in the chord length direction of the turbine stator blade 7b is provided.

In a case where the depression portions 31a or the protrusion portions 31b are not provided, the base surface 32 is configured as a surface which includes the surface of the inner end wall 30 corresponding to these portions.

Each protrusion portion 31b is provided in part of each area positioned between the front ends 7b1 of the turbine stator blades 7b when viewed from the direction of the turbine axis L and is formed so as to protrude relative to the base surface 32.

In the protrusion portion 31b, a surface of the inner end wall 30 is shifted toward the opposite side to the turbine axis L (outward in the radial direction of the shaft 9), relative to the base surface 32, and thereby a protrusion is formed.

That is, in this embodiment, the depression portions 31a and the protrusion portions 31b are alternately provided, and pairs of them are provided at the same intervals as the arrangement intervals of the turbine stator blades 7b. Therefore, as shown in the schematic diagram of FIG. 3, the upstream flow path surface 31 has a wave shape in the circumferential direction around the turbine axis L.

In this embodiment, as shown in FIG. 3, a depression area Ra formed by the depression portion 31a and the base surface 32 viewed from the direction of the turbine axis L, and a protrusion area Rb formed by the protrusion portion 31b and the base surface 32 viewed from the direction of the turbine axis L are set to be equal to each other.

That is, the depression amount of the depression portion 31a and the protrusion amount of the protrusion portion 31b are set so that the sum total of the depression areas Ra and the sum total of the protrusion areas Rb are equal to each other.

In other words, the depression area Ra is an area enclosed by the surface of the depression portion 31a and the surface of the base surface 32 when viewed from the direction of the turbine axis L. The protrusion area Rb is an area enclosed by the surface of the protrusion portion 31b and the surface of the base surface 32 when viewed from the direction of the turbine axis L.

Referring back to FIG. 1, the low pressure turbine 8 is disposed in the downstream side of the high pressure turbine 7, and further generates rotative force by using the hot gas which has passed through the high pressure turbine 7.

The low pressure turbine 8 includes turbine rotor blades 8a fixed to the first shaft 9a in the shaft 9, and turbine stator blades 8b fixed to the core flow path 12 (the inner wall of the inner cowl 2). The turbine rotor blades 8a receive the hot gas which has been adjusted by the turbine stator blades 8b, and thereby the first shaft 9a is driven rotationally.

The shaft 9 is a rod-shaped member disposed in the air-flowing direction. The shaft 9 transmits the rotative force obtained by turbines (the high pressure turbine 7 and the low pressure turbine 8), to the fan 3 and to compressors (the low pressure compressor 4 and the high pressure compressor 5).

As described above, the shaft 9 is divided in the radial direction thereof, and is composed of the first shaft 9a and the second shaft 9b.

The first shaft 9a is provided with the fan rotor blades 3a of the fan 3 and the rotor blades 4a of the low pressure compressor 4, at the upstream side thereof and is provided with the turbine rotor blades 8a of the low pressure turbine 8 at the downstream side thereof.

In addition, the second shaft 9b is provided with the rotor blades 5a of the high pressure compressor 5 at the upstream side thereof and is provided with the turbine rotor blades 7a of the high pressure turbine 7 at the downstream side thereof.

The main nozzle 10 is provided in the further downstream side of the low pressure turbine 8, and discharges the hot gas which has passed through the low pressure turbine 8, backward of the jet engine S1.

The thrust of the jet engine S1 is obtained by the reaction in discharging the hot gas from the main nozzle 10.

The cooling air supply unit 11 extracts the compressed air produced by the high pressure compressor 5, and supplies this extracted-compressed air as cooling air, from the end of the inner end wall 30 in the upstream side thereof, to the turbine stator blades 7b.

In addition, the cooling air supply unit 11 may extract the compressed air produced by the low pressure compressor 4, and may supply this extracted-compressed air as cooling air, from the end of the inner end wall 30 in the upstream side thereof, to the turbine stator blades 7b.

In the jet engine S1 of this embodiment having the above-described configuration, in a normal operational state, air is taken into the outer cowl 1 by the operation of the fan 3, and part of the air flows into the core flow path 12.

The air which has flowed into the core flow path 12 is sequentially compressed by the low pressure compressor 4 and the high pressure compressor 5 and is thereafter supplied to the combustion chamber 6.

The compressed air supplied to the combustion chamber 6 is mixed with fuel, and thereby the air-fuel mixture is produced. The air-fuel mixture is burned in the combustion chamber 6, and thereby the hot gas is generated.

The hot gas generated in the combustion chamber 6 passes through the high pressure turbine 7 and the low pressure turbine 8 and is discharged from the main nozzle 10 backward of the jet engine S1. Thereby, the thrust is obtained.

When the hot gas passes through the high pressure turbine 7, the rotative force is obtained by the high pressure turbine 7. By using this rotative force, the rotor blades 5a of the high pressure compressor 5 connected to the high pressure turbine 7 through the second shaft 9b are driven rotationally.

In addition, when the hot gas passes through the low pressure turbine 8, the rotative force is obtained by the low pressure turbine 8. By using this rotative force, the fan rotor blades 3a of the fan 3 and the rotor blades 4a of the low pressure compressor 4 are driven rotationally, which are connected to the low pressure turbine 8 through the first shaft 9a.

The jet engine S1 of this embodiment having the above-described configuration includes the depression portions 31a in the upstream flow path surface 31, each depression portion 31a in which an area including at least an area overlapping with the front end 7b1 of the turbine stator blade 7b when viewed from the direction of the turbine axis L is depressed from the base surface 32.

When the upstream flow path surface 31 is depressed relative to the base surface 32, it is possible to prevent the increase of the static pressure due to the existence of the turbine stator blades 7b. If the depression portion 31a is not formed, the static pressure in the area overlapping with the front end 7b1 of the turbine stator blade 7b when viewed from the direction of the turbine axis L is increased due to the existence of the turbine stator blade 7b.

Therefore, according to the jet engine S1 of this embodiment, by the depression portion 31a, it is possible to prevent the increase of the static pressure in the area in which the static pressure is usually increased excessively.

Consequently, according to the jet engine S1 of this embodiment, it is possible to make uniform the static pressure distribution in the circumferential direction around the turbine axis L and to make uniform the thickness of the cooling film formed of the cooling air supplied from the cooling air supply unit 11.

As a result, according to the jet engine S1 of this embodiment, it is possible to prevent an area having a high temperature from being generated in the upstream flow path surface 31, and to make uniform the cooling efficiency at the flow path surface. Since the supply of the cooling air does not have to be increased to satisfy the supply to the area having low cooling efficiency, it is possible to reduce the entire supply of the cooling air, and to improve the performance of the jet engine S1.

If only the above-described depression portions 31a are formed, since the upstream flow path surface 31 is shifted so that its flow path area is enlarged, the flow path area in the upstream side of the turbine stator blade cascade 20 may be enlarged, and thereby the aerodynamic characteristics in the upstream side of the turbine stator blade cascade 20 may be changed.

However, the jet engine S1 of this embodiment includes the protrusion portions 31b in the upstream flow path surface 31, each protrusion portion 31b being such that at least part of each area positioned between the front ends 7b1 of the turbine stator blades 7b when viewed from the direction of the turbine axis protrudes from the base surface 32.

Therefore, in the jet engine S1 of this embodiment, the upstream flow path surface 31 is shifted so that the flow path area at the protrusion portion 31b is reduced. By balancing the decrement of the flow path area by the protrusion portion 31b with the increment of the flow path area by the depression portion 31a, it is possible to prevent the entire flow path area in the upstream side of the turbine stator blade cascade 20 from being changed.

In addition, in this embodiment, the depression area Ra formed by the depression portion 31a and the base surface 32 viewed from the direction of the turbine axis L, and the protrusion area Rb formed by the protrusion portion 31b and the base surface 32 viewed from the direction of the turbine axis L are set equal to each other. Therefore, even when the depression portions 31a and the protrusion portions 31b are provided, the entire flow path area in the upstream side of the turbine stator blade cascade 20 is configured so as not to be changed.

Consequently, according to the jet engine S1 of this embodiment, it is possible to prevent the aerodynamic characteristics thereof from being changed and to make uniform the cooling efficiency at the flow path surface.

Hereinbefore, the preferable embodiment of the present invention is described with reference to the drawings, but the present invention is not limited to the above-described embodiment and is limited only to the scope of the attached claims. A shape, a combination or the like of each component shown in the above embodiment is illustrative only, and additions, omissions, substitutions, or other modifications to the configuration can be adopted within the scope not departing from the gist of the present invention.

For example, in the above embodiment, the configuration is described in which the turbine stator blades 7b are used as the turbine blades of the present invention, and a surface of the inner end wall 30 is used as the flow path surface which is connected to the base surface and which is positioned in the upstream side of the turbine blade cascade in the present invention.

However, the configuration may be adopted in which the turbine rotor blades 7a are used as the turbine blades of the present invention, and a surface of a hub (provided in the second shaft 9b) to which the turbine rotor blades 7a are fixed is used as the flow path surface which is connected to the base surface and which is positioned in the upstream side of the turbine blade cascade, in the present invention.

That is, by applying the present invention, the configuration may be adopted in which depression portions and protrusion portions are provided in the flow path surface in the upstream side of the turbine rotor blade cascade composed of the turbine rotor blades 7a.

For example, in the present invention, the configuration may be adopted in which depression portions and protrusion portions are provided in the upstream flow path surface of the outer end wall 40.

In addition, in the present invention, the configuration may be adopted in which depression portions and protrusion portions are provided in the flow path surface in the upstream side of the turbine stator blade cascade or of the turbine rotor blade cascade in the low pressure turbine 8.

In addition, the shape of the depression portion 31a or the protrusion portion 31b in the above embodiment is an illustration, and the shape may be suitably set in consideration of the criteria of stable machining or the aerodynamic characteristics of the inner end wall 30.

INDUSTRIAL APPLICABILITY

The present invention can be widely applied to a gas turbine engine in which cooling air is supplied to the upstream side of turbine blades.

DESCRIPTION OF REFERENCE SIGNS

S1 Jet engine (gas turbine engine)
7b Turbine stator blade (turbine blade)
7b1 Front end
11 Cooling air supply unit
20 Turbine stator blade cascade (turbine blade cascade)
30 Inner end wall
31 Upstream flow path surface
31a Depression portion
31b Protrusion portion
32 Base surface
Ra Depression area
Rb Protrusion area

The invention claimed is:

1. A gas turbine engine comprising:
   a turbine blade cascade formed by annularly arranging turbine blades around a turbine axis;
   a cooling air supply unit to supply cooling air to the turbine blades;
   a base surface which is a surface without depression portions or protrusion portions and on which at least a trailing half of each turbine blade in a chord length direction of the turbine blade is provided, the trailing half being a portion of the turbine blade from a middle position, which is between a leading edge and a trailing edge of the turbine blade, to the trailing edge of the turbine blade; and
   a flow path surface formed so as to be positioned in an upstream side of the turbine blade cascade and so as to be connected to the base surface,
   wherein the flow path surface includes:
      depression portions depressed relative to the base surface, each depression portion including at least an area overlapping with the leading edge of each of the turbine blades, when viewed from a direction of the turbine axis; and
      protrusion portions protruding relative to the base surface, each protrusion portion being at least part of each area positioned between the leading edges of the turbine blades, when viewed from the direction of the turbine axis.

2. The gas turbine engine according to claim 1, wherein a depression area formed by the depression portion and the base surface viewed from the direction of the turbine axis, and a protrusion area formed by the protrusion portion and the base surface viewed from the direction of the turbine axis are set equal to each other.

3. The gas turbine engine according to claim 1, wherein the turbine blades are turbine stator blades.

4. The gas turbine engine according to claim 2, wherein the turbine blades are turbine stator blades.

5. The gas turbine engine according to claim 1, wherein a width of each of the depression portions in a circumferential direction around the turbine axis is greater than a width of each of the protrusion portions in the circumferential direction.

6. The gas turbine engine according to claim 1, wherein the depression portions and the protrusion portions are provided in the flow path surface of an outer end wall.

* * * * *